United States Patent [19]

Anderson

[11] 4,290,297

[45] Sep. 22, 1981

[54] OPTICALLY COUPLED CALIBRATOR FOR TRANSMITTERS

[75] Inventor: Loren A. Anderson, Farwell, Minn.

[73] Assignee: Rousemount Inc., Minneapolis, Minn.

[21] Appl. No.: 147,734

[22] Filed: May 8, 1980

Related U.S. Application Data

[63] Continuation of Ser. No. 38,446, May 14, 1979, abandoned.

[51] Int. Cl.³ ............................................. G01P 21/00
[52] U.S. Cl. ...................................................... 73/1 R
[58] Field of Search ............. 73/1 R, 1 DV; 340/189; 367/13

[56] References Cited

U.S. PATENT DOCUMENTS

| | | | |
|---|---|---|---|
| 2,715,717 | 8/1955 | Keithley | 73/1 R |
| 2,830,191 | 4/1958 | McCollom et al. | 73/1 R |
| 3,964,020 | 6/1976 | Dickerson | 250/199 |
| 4,119,948 | 10/1978 | Ward et al. | 340/189 R |

Primary Examiner—S. Clement Swisher
Attorney, Agent, or Firm—Kinney, Lange, Braddock, Westman and Fairbairn

[57] ABSTRACT

A calibrator for use in calibrating a two wire DC transmitter includes an oscillator and a light emitter which produce a time varying light signal of known frequency. No physical connection is required between the calibrator and the transmitter, other than a path for the light signal. The transmitter includes a light sensor which is responsive to the presence of the light signal and which produces a time varying calibration signal in response to the light signal. Calibration adjustment circuitry in the transmitter is used to adjust the output of the transmitter when the calibration signal is provided, thereby calibrating the transmitter.

22 Claims, 5 Drawing Figures

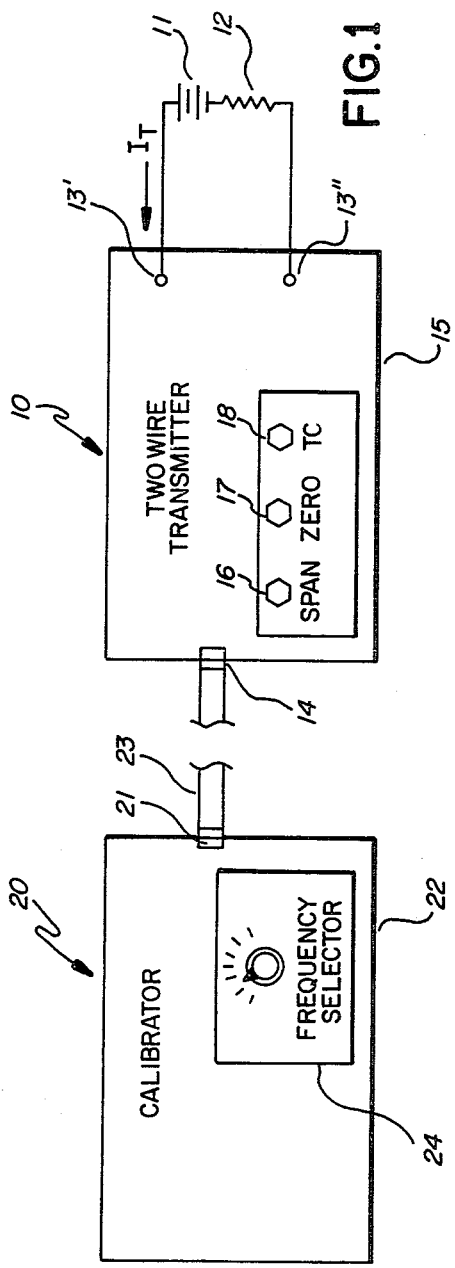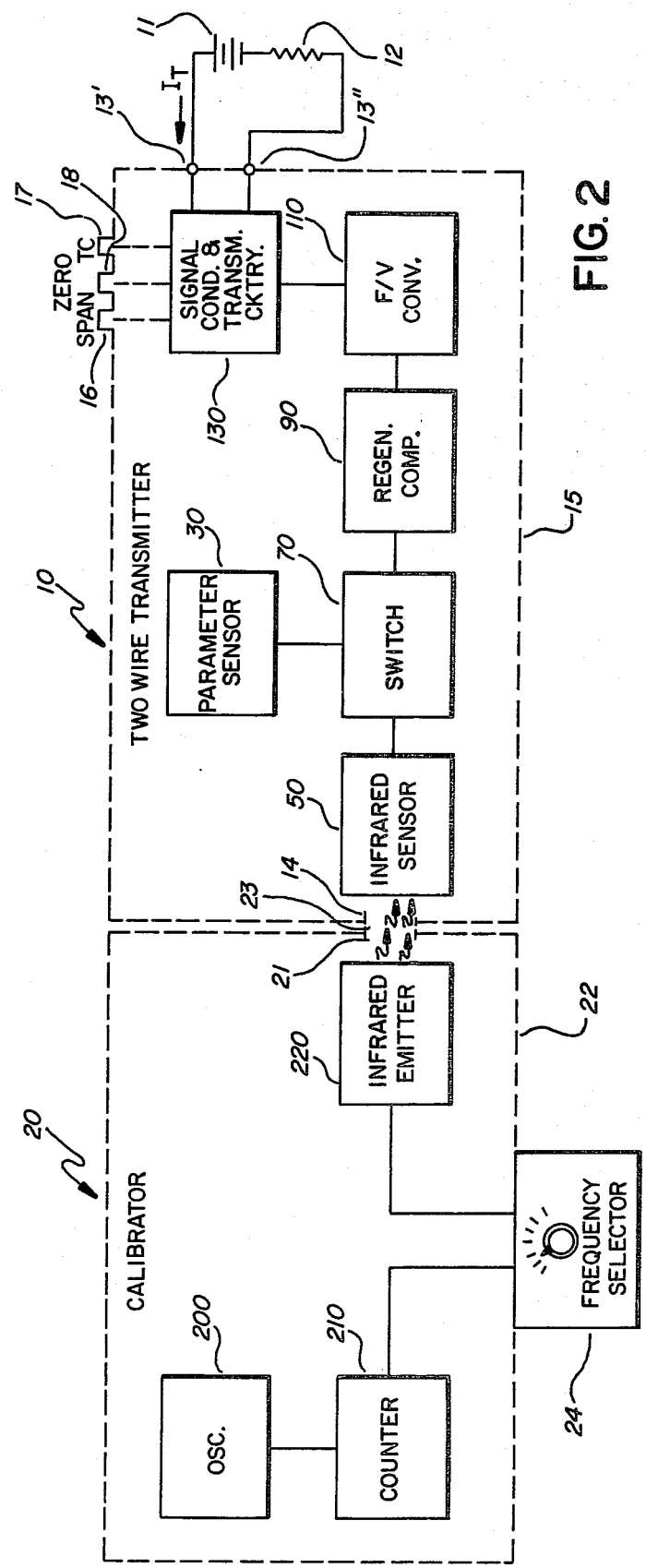

OPTICALLY COUPLED CALIBRATOR FOR TRANSMITTERS

This is a continuation of application Ser. No. 38,446, filed May 14, 1979, now abandoned.

BACKGROUND OF THE INVENTION

1. Field of the Invention

This invention relates to the interconnection of electronic circuitry. In particular, the present invention relates to an optically coupled calibrator for use in calibrating transmitters, such as a two wire transmitter.

2. Description of the Prior Art

Since the discovery of electricity, electrical and electronic circuit components have been coupled by current carrying conductors to perform desired functions. The valence ring of these conductors' atoms are typically metallic and have one, two or three electrons. These electrons are called "free" electrons as the application of a very small voltage causes the electron to leave the atom, hence causing an electrical current. Typical conductors are copper, silver, gold, aluminum and others.

In recent times, electrical and electronic components have been coupled together by a light signal. Typically, these applications have used a light emitter, a light sensor, and an optical transmission means, such as a fiberoptic cable. As used in this patent application, the term "light" is not limited to visible radiation but rather includes electromagnetic radiation in the infrared, visible, and ultraviolet portions of the spectrum. Example of prior art systems of this type include the following patents.

In U.S. Pat. No. 3,493,760 to Hoadley, an electrical signal modulates a gallium arsenide light source and the light beam from the source is directed through aperatures in the shielded instrumentation package such as those used for weapons systems to a light sensitive diode which reproduces the electrical signal for use by the instrumentation circuit. This patent provides for transducer light isolation and does not solve the calibration problem for industrial transmitters.

In U.S. Pat. No. 3,346,811 to Perry et al. a device for sensing an electrical condition near a high voltage transmission line and transmitting the intelligence through a fiber optic dielectric device to a light signal receiving means near ground potential is described. This patent also describes transducer isolation by light signals.

U.S. Pat. No. 3,964,020 to Dickerson describes a high voltage system with self test circuitry. The self-test is a test of the communication links. This patent describes transducer isolation by light signals.

The prior art has shown the use of the light signals to provide isolation, however, as indicated in these prior art patents, the light isolation is provided between the signal sensing element and the electronics.

SUMMARY OF THE INVENTION

The present invention provides apparatus for calibrating a two wire DC transmitter by means of a light signal. A calibrator generates a known time varying signal, which is coupled to a light emitter. The light emitter provides a varying light signal responsive to the known time varying signal and is radiated from the calibrator through a suitable opening in the calibrator. When the calibrator and the transmitter are optically coupled a light sensor in the transmitter provides a time varying calibration signal responsive to the varying light signal. The transmitter includes a sensor for providing a time varying sensor signal. A selector in the transmitter provides either the calibration signal or the sensor signal to the current control. The current control provides control of the total DC current $I_T$ in the two wires which couple the transmitter to an external DC power supply and external series connected load, representative of the selected signal. The transmitter includes devices to adjust the total DC current from the transmitter. These adjustment devices are manipulated when the time varying calibration signal is applied to the current control, thus calibrating the transmitter. In another embodiment the calibrator has a frequency time varying counter or synthesizer coupled between the known time varying signal, which provides selectable time varying signals arithmetically related to the known time varying signals, so that the total DC current may be calibrated in response to selectable known signals. Still another embodiment of the invention provides in the transmitter for automatic coupling of the calibration signal to the current control in the transmitter whenever such calibration signal is received by the light sensor.

The calibrator in one embodiment of the present invention is coupled to the transmitter only through a media that permits light to pass such as air, thus not requiring any physical connection such as a conductor to the calibrator or the transmitter. A conduit for light such as glass, or fiber optical material provides satisfactory coupling without the requirement of physical connection.

The advantages of the optical coupling over the existing electrical conductor are numerous, for example, the calibrating signal is coupled to a transmitter housed in a water tight, explosion proof, intrinsically safe enclosure without disturbance of such enclosure as the light sensor is mounted inside of the enclosure and the time varying signal is coupled through the enclosure bulkhead by a material through which the light is able to pass. The calibrating signal is coupled by the light signal to a transmitter in a relatively physically inaccessible position as no physical connection is required other than a path for the calibrating light signal. Similarly the transmitter receives the calibrating light signal in a hazardous position while the calibrator is not exposed to such hazard, thereby providing safe conditions for personnel. The time varying light signals are relatively unaffected by Electro Magnetic Interference (EMI), Radio Frequency Interference (RFI) and other electrical interference which affect electrical calibration signals.

BRIEF DESCRIPTION OF THE DRAWINGS

FIG. 1 is a physical representation of the calibrator and the two wire transmitter.

FIG. 2 is an electrical block diagram representation of the calibrator and the two wire transmitter.

DESCRIPTION OF THE PREFERRED EMBODIMENT

The Calibration Apparatus of FIG. 1

Figure 3:
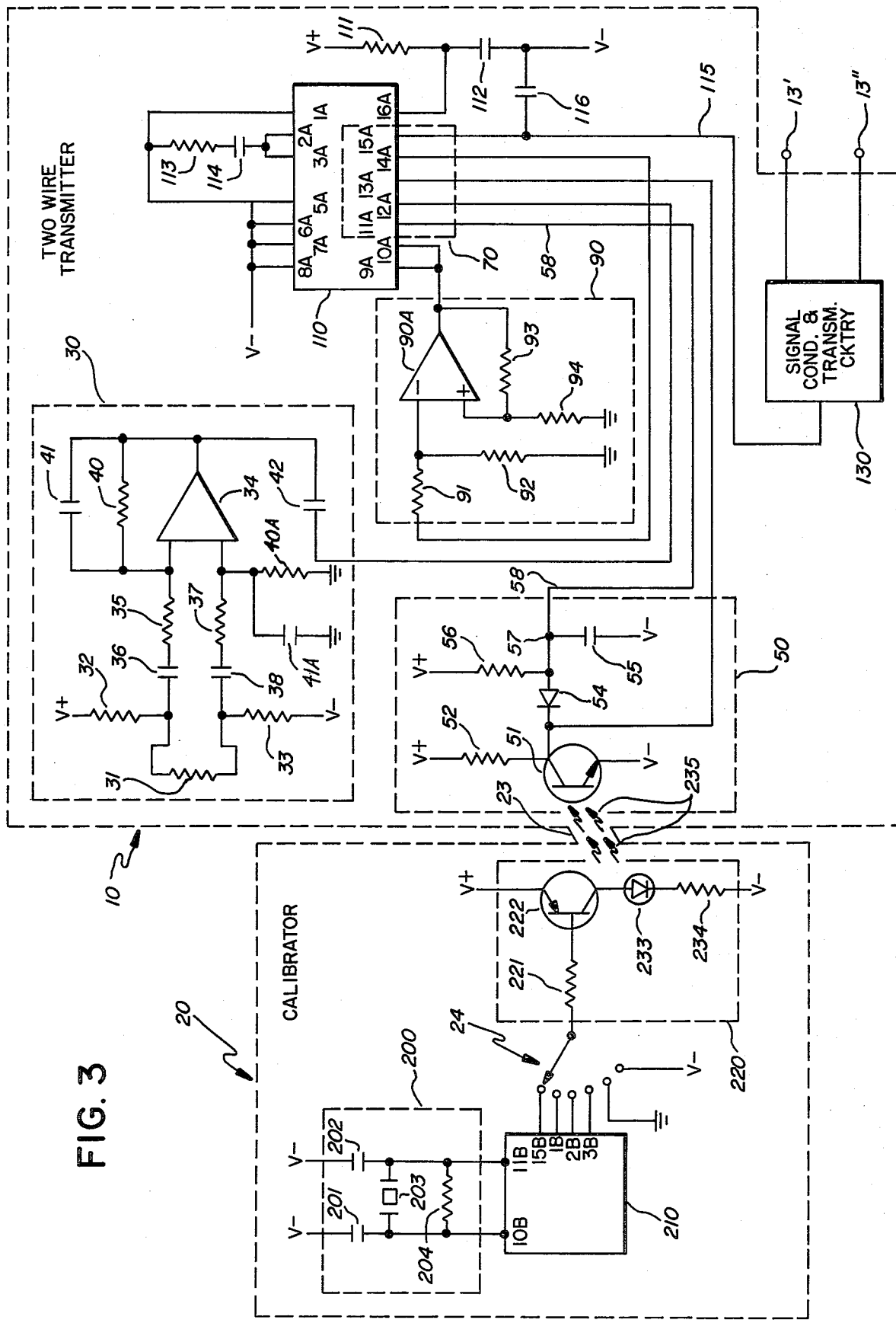
FIG. 3 is an electrical schematic representation of the calibrator and the two wire transmitter.

In FIG. 1, a two wire transmitter 10 is coupled to an external DC supply 11 through a series connected external load 12 by the same two wires through which the total DC current ($I_T$) representative of a parameter to be sensed flows. The two wires are connected to terminals 13' and 13" of transmitter 10.

A calibrator 20 for two wire transmitter 10 provides a time varying light signal at a suitable opening 21 in a housing 22 to pass light. Light signal path means 23, which is a suitable medium to pass light such as air, glass, fiber optic material and others is optically coupled to opening 21 for transmitting the light signal to transmitter 10. Calibrator 20 also preferably includes a frequency selector 24 disposed on housing 22, by which means the frequency of the light signal is selected. At transmitter 10, a suitable medium 14 is disposed in housing 15 to pass the light signal into transmitter 10.

When calibration of transmitter 10 is desired, a light signal generated in calibrator 20 passes through opening 21 and along light path means 23 to medium 14 at transmitter 10, where the light signal is used to calibrate the total current ($I_T$) from transmitter 10 as a function of the light signal. Transmitter 10 is preferably provided with suitable adjustment devices disposed on housing 15 so that housing 15 remains intact and unopened while adjustments based on known frequency light signals from calibrator 20 are accomplished. SPAN adjusting device 16, ZERO adjusting device 17, and time constant (TC) adjusting device 18 are the adjusting devices shown in the preferred embodiment shown in FIG. 1.

Calibrator 20 provides a selectable frequency light signal to transmitter 10 without physical connection other than light path means 23. The need for interconnection of calibrator 20 to transmitter 10 by electrical conductors and terminals, therefore, is eliminated. The adjustments to transmitter 10 provided by adjustment devices 16, 17 and 18 do not require housing 15 to be opened.

The Calibration Apparatus of FIG. 2

In FIG. 2, two wire transmitter 10 and calibrator 20 are again illustrated. In FIG. 2 (as well as in later discussed FIGS. 3 and 4) corresponding elements to those in FIG. 1 have the same reference numbers. Transmitter 10 includes a signal generator 30 which outputs a time varying sensor signal which is representative of a physical parameter to be sensed. The time varying sensor signal is coupled to switch 70, as is the output signal of infrared light sensor 50. In the preferred embodiment shown in FIG. 3, the light signal is in the infrared portion of the electromagnetic spectrum. Infrared sensor 50 is used to sense the presence at medium 14 in housing 15 of the time varying light signal. Infrared sensor 50 produces a time varying calibration signal in response to the light signal received. In this embodiment, switch 70 in its normal position connects the signal generator 30 with a regenerative comparator 90. Upon detection of time varying infrared light signal by infrared sensor 50, switch 70 automatically decouples signal generator 30 and couples the output of infrared sensor 50 to comparator 90.

Comparator 90 is responsive to the relatively slow time varying input voltage from signal generator 30 (i.e. the sensor signal) or infrared sensor 50 (i.e. the calibration signal) and provides an output square wave with nearly vertical sides. The output from comparator 90 is coupled to a frequency to voltage convertor 110, which together with a RC filter (shown in FIG. 3) at its output, converts the square wave output of the comparator 90 to a relatively stable DC voltage representative of either the sensor signal from signal generator 30 or the calibration signal from detector 50. The stable DC voltage is coupled to signal conditioning and transmitting circuitry 130 (such as shown in FIG. 4).

Calibrator 20 provides the infrared time varying light signal for calibration to transmitter 10. Calibrator 20 has an oscillator 200 for generating a time varying signal coupled to a counter 210 which performs arithmetic operations on the time varying signal from oscillator 200. Counter 210 provides at its outputs time varying oscillator signals arithmetically related to the time varying signal from oscillator 200.

Counter 210 is coupled to an infrared emitter 220 through a frequency selector 24, which selects one of the multiple time varying oscillator signals from counter 210. Infrared emitter 220 is controlled by the selected time varying signal an provides an infrared time varying light signal which varys responsive to the time varying oscillator signal at its input. This time varying light signal is coupled to media 14 through light path means 23 and opening 21. It is understood by those skilled in the art that the functions of counter 210 and selector 24 in one embodiment is a frequency synthesizer. It is also understood that in other embodiments oscillator 200 may be coupled directly to an infrared emitter 220.

In the preferred embodiments calibrator 20 is powered from a conventional power supply such as a battery (not shown). The time varying light signal from calibrator 20 is used in conjunction with the SPAN 16, ZERO 17 and time constant (TC) 18 adjusting devices at transmitter 10 to make SPAN, ZERO and time constant (TC) calibration adjustments of transmitter 10.

The Calibration Apparatus of FIG. 3

In FIG. 3, a portion of transmitter 10 and calibrator 20 are shown in further detail. Signal generator 30 of transmitter 10 includes a sensor 31, which perferably is a strain gage which changes its resistance, responsive to a vibratory or oscillating condition of a parameter to be sensed. Sensor 31 is connected between two resistors 32 and 33, which are coupled to the circuit positive and negative voltage (V+ and V−), respectively. As a vibratory and oscillating condition is applied to sensor 31, a change in voltage responsive to the change in physical condition is sensed at the inputs of an amplifier 34. The inverting input of amplifier 34 is coupled to sensor 31 through a resistor 35 and a coupling capacitor 36 and at the non-inverting input through a resistor 37 and a coupling capacitor 38. Resistors 35 and 37 and their associated capacitors 36 and 38 determine the low frequency response characteristic of amplifier 34. A resistor 40 and a capacitor 41 are connected from the output of amplifier 34 to its inverting input to provide feedback, and together with resistor 40A and capacitor 41A determine the high frequency response characteristic of amplifier 34. The output of amplifier 34 provides the time varying sensor signal responsive to time varying signals at its inputs. It is further understood that the output of the sensor 31 may be connected directly to switch 70 or be amplified by other means.

The output of amplifier 34 is connected through a capacitor 42 and switch 70 (which is located within an integrated circuit which also forms frequency-to-voltage convertor 110) to regenerative comparator 90. The signal from switch 70 is supplied to the inverting input of comparator amplifier 90A through resistor 91. The inverting input of comparator amplifier 90A is biased through resistor 92 to ground. The non-inverting input is also coupled to circuit ground through resistor 94 which together with resistor 93 sets hysteresis on comparator amplifier 90A. The output of comparator 90 is in turn coupled to frequency-to-voltage convertor 110, which in one preferred embodiment is a CD 4053A digital integrated circuit of Radio Corporation of America. In that embodiment, comparator 90 is connected to the input terminals 9A and 10A where the signal logic level is converted. The signal then passes through the decoder of convertor 110. The output of convertor 110 at pin 15A on line 115 is a relatively smooth DC voltage responsive to the input signal. This output DC voltage is then further smoothed by a relatively large capacitor 116. Positive voltage ($V_{DD}$) is supplied to convertor 110 at terminal 16A, through a resistor 111 and a capacitor 112. Unused input leads 1A, 5A, 6A, 7A and 8A are connected to negative voltage $V_{SS}$. Pins 2A and 3A of convertor 110 are coupled to negative voltage $V_{SS}$ through a resistor 113 and a capacitor 114.

In the preferred embodiment in which convertor 110 is a CD4053A integrated circuit, switch 70 is preferably a switch which is a part of the same CD4053A integrated circuit. Switch 70 connects either pin 12A or pin 13A to output pin 14A depending upon the state of an input signal at pin 11A of the CD4053A integrated circuit.

The output DC voltage on line 115 is supplied to signal conditioning and transmitting circuitry 130. The total transmitter current $I_T$ is controlled by signal conditioning and transmitting circuitry 130 as a function of the output DC voltage on line 115.

Oscillator 200 of calibrator 20 is comprised of two capacitors 201 and 202 each connected to a power supply as indicated, together with a piezoelectric crystal 203, and a resistor 204 which are connected to capacitors 201 and 202. The output of oscillator 200 is a known frequency time varying signal which is coupled to the input of counter 210. In one preferred embodiment, counter 210 is a CD 4060A binary counter, divider and oscillator digital integrated circuit by Radio Corporation of America, in which case the inputs are coupled to pins 10B and 11B, respectively. The outputs of counter 210, which are time varying oscillator signals related to the signal at the counter 210 input, appear at pins 15B, 1B, 2B and 3B respectively. Counter 210 performs known arithmetic operations on the known time varying signals at its inputs, hence providing at its outputs known frequency time varying signals, each arithmetically related to the time varying signals at its inputs and the arithmetic operation on the input signal. Frequency selector 24 is coupled to counter 210 and provides for selection of time varying signals. The output of frequency selector 24 is then coupled through a resistor 221 to the base of a control transistor 222. The emitter of transistor 222 is connected to the positive power supply and the collector is connected to the anode of an infrared emitter diode 233, which preferably is an Infrared Emitter OP133W manufactured by Optron Inc., Carrollton, TX 75006. The cathode of emitter 233 is connected through a resistor 234 to the negative power supply. When emitter 233 is forward biased through transistor 222, conduction results in emission of an infrared light signal indicated by arrows 235. The conduction frequency of emitter 233 and therefore the modulation frequency of the light signal is responsive to the time varying oscillator signal applied to the base of transistor 222.

Calibrator 20 outputs a time varying light signal which is an infrared light signal responsive to the selected time varying oscillator signal supplied through switch 24. This light signal is coupled from calibrator 20 to transmitter 10 through light path means 23.

In transmitter 10, an infrared responsive phototransistor 51 in infrared sensor 50 conducts in response to the time varying light signal from emitter 233. Phototransistor 51 preferably is an OP805 of Optron Inc. Phototransistor 51 has its collector connected to the positive power supply through resistor 52 and its emitter connected to the negative supply for bias. Also, the collector of photo-transistor 51 is connected through a diode 54 and a capacitor 55 to the negative power supply. A resistor 56 is connected between the positive power supply and circuit node 57, which is located between diode 54 and capacitor 55. Line 58 is also connected to circuit node 57 and to pin 11A of convertor 110, which is the control input for switch 70. As discussed previously, switch 70 preferably is a portion of the CD4053A integrated circuit which forms convertor 110. When line 58 goes to a low voltage, pin 11A (which is the control for switch 70) goes to a low voltage, and switch 70 moves from pin 12A to pin 13A thus connecting the collector of phototransistor 51 to converter 110 through pins 13A and 14A thereof and to the inverting input of comparator amplifier 90A. Resistor 56 and capacitor 55 are selected based on the range of time varying light signals applied to phototransistor 51, so that the lowest frequency light signal received at the base of phototransistor 51 is fast enough to discharge capacitor 55 through resistor 56 and fast enough to prevent capacitor 55 from charging to a voltage level to allow the control input 11A of switch 70 to return to its normal state. Since the collector of photo-transistor 51 is varying responsive to the time varying light signal at its base, the output of comparator 90 is similarly now controlled by the time varying light signal of calibrator 20. The output of comparator 90 is coupled to the input (pins 9A and 10A) of convertor 110, and is converted to a smooth DC voltage on line 115 which is reprensentative of the frequency of the light signal from calibrator 20.

Figure 4A:
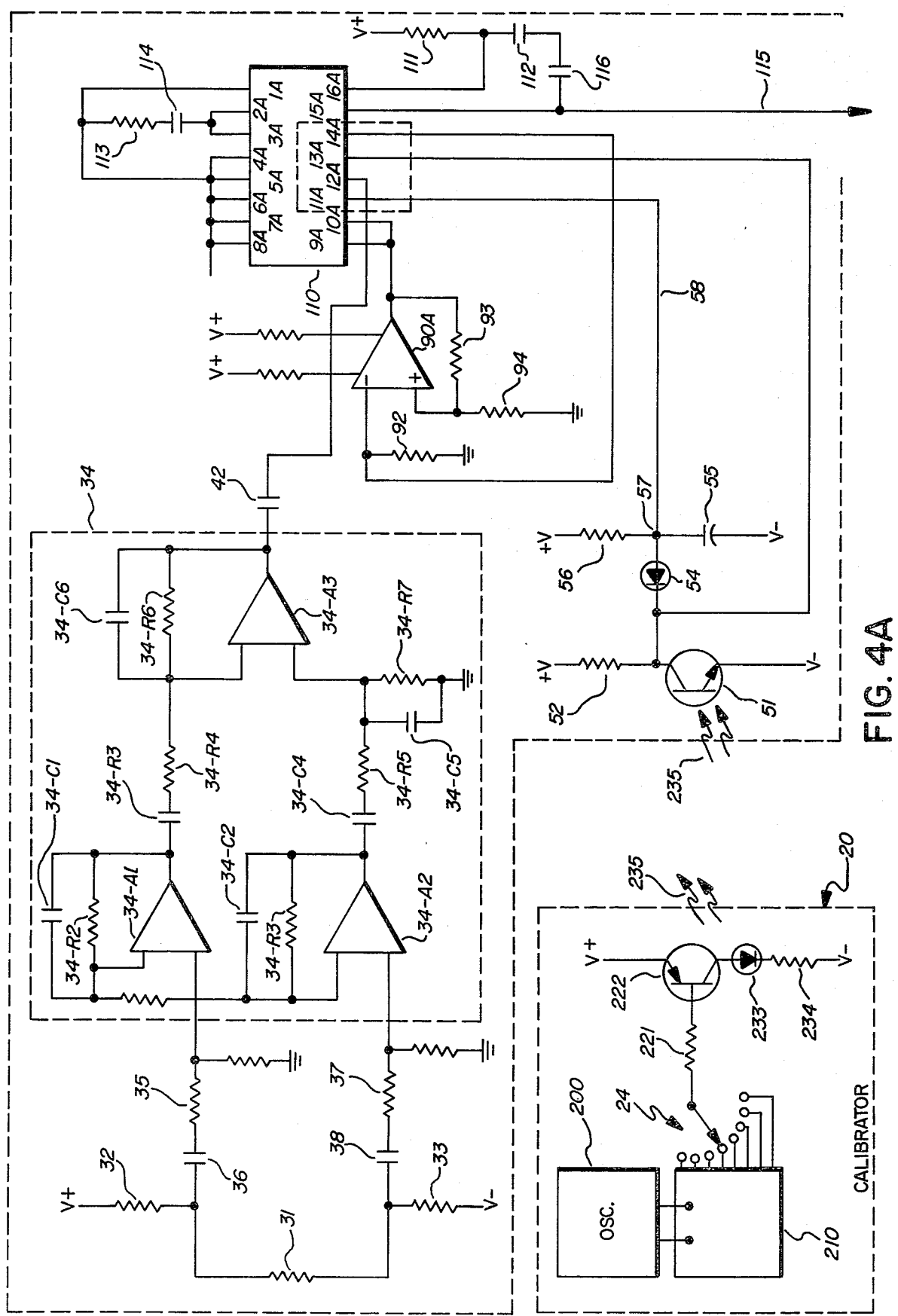
FIGS. 4A and 4B are a more detailed electrical schematic representation of the calibrator and the two wire transmitter of FIG. 3.
Figure 4B:
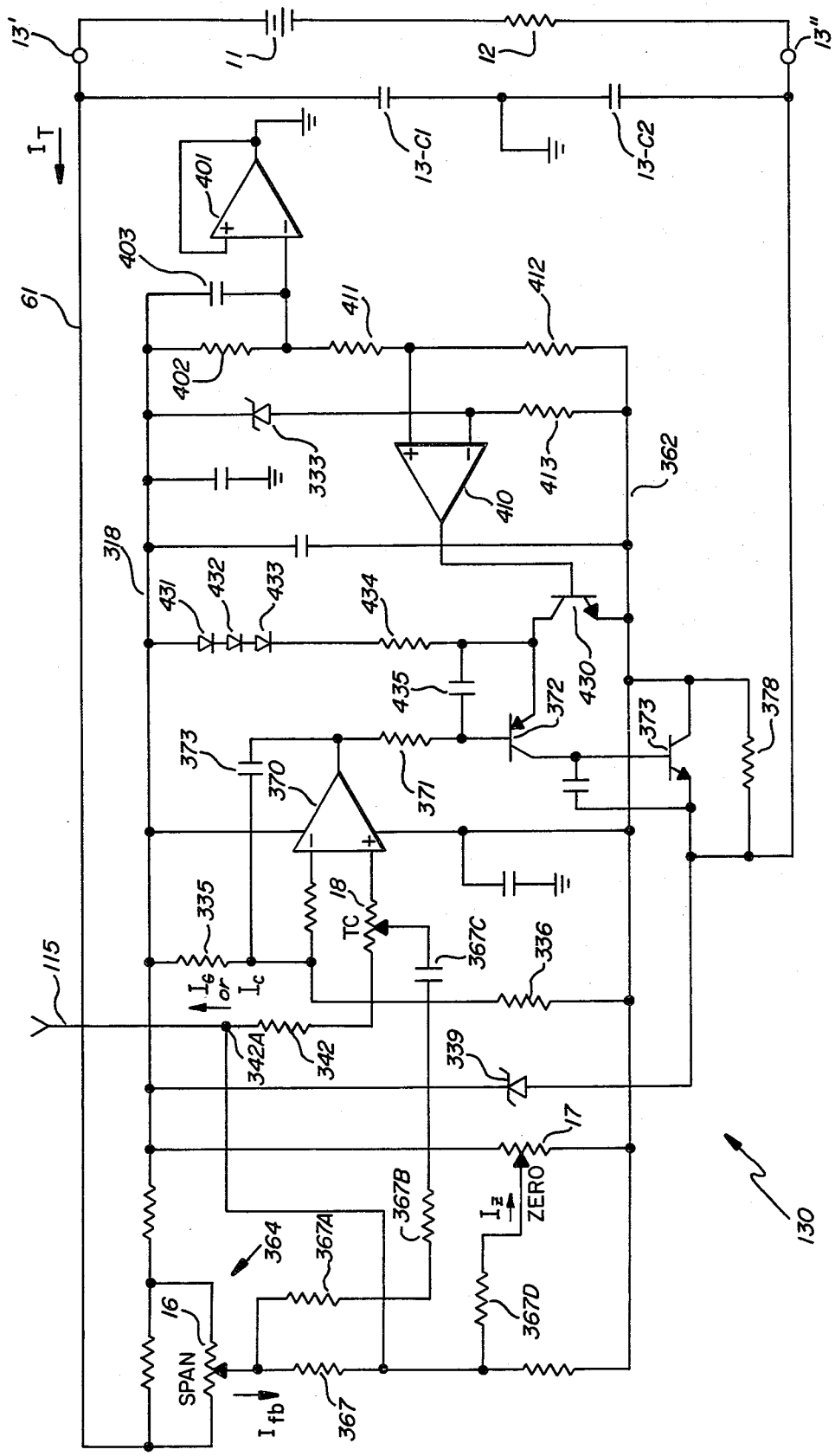

The Calibration Apparatus of FIGS. 4A and 4B.

FIGS. 4A and 4B show the apparatus of FIG. 3 in still further detail.

In FIG. 4A, amplifier 34 is shown as a conventional instrumentation amplifier including operational amplifiers 34-A1, 34-A2 and 34-A3, resistors 34-R1, 34-R2, 34-R3, 34-R4, 34-R5, 34-R6 and 34-R7, and capacitors 34-C1, 34-C2, 34-C3, 34-C4, 34-C5, and 34-C6. This preferred emobodiment of amplifier 34 overcomes the limitations of a single amplifier differential amplifier circuit.

FIG. 4B shows a preferred embodiment of signal conditioning and transmitting circuitry 130. The output of convertor 110 on line 115 is carried to a current control amplifier 370. The operation of the current control circuit of which current control amplifier 370 forms a part, is fully explained in U.S. Pat. No. 3,975,719 held by the same assignee and incorporated herein by reference. The function of the current control circuit is to provide control of the total current $I_T$ in a line 61 as a function of the parameter being measured. Total current $I_T$ passes through supply 11 and a series connected load resistor 12 and through terminals 13' and 13". Transients are smoothed by capacitors 13-C1 and 13-C2 to ground. A resistor network 364 is comprised of SPAN adjusting device 16, which preferably is a potentiometer as shown in FIG. 1 and a resistor 367 in parallel with resistors 367A and 367B through a capacitor 367C to a variable time constant adjusting device (TC) 18 which preferably is a potentiometer as shown in FIG. 1 and to the non-inverting of current control amplifier 370. The (TC) device 18 adjusts the response characteristic of amplifier 370. ZERO adjusting device 17, which also preferably is a potentiometer as shown in FIG. 1 is coupled to the non-inverting input of amplifier 370 through a resistor 367D, to a circuit node 342A. Circuit node 342A is a DC current summing node. The resultant DC current representative of the time varying sensor $I_S$ or calibration signal $I_C$ flows on line 115 to node 342A. A small but known portion of the total DC current $I_T$, the feedback current $I_{fb}$ is tapped at the wiper of SPAN adjusting device 16, this current is summed with the ZERO current $I_Z$ through ZERO adjusting device 17 at circuit node 342A. Current control amplifier 370 adjusts $I_T$ such that the feedback current $I_{fb}$ is equal to the sum of the ZERO current and the sensor current $I_S$ or the calibrating current $I_C$ that is:

$$I_{fb} = I_Z + (I_S \text{ or } I_C).$$

Therefore, the total DC current $I_T$ is a function of Aop $[I_Z + (I_S \text{ or } I_C)]$, where Aop is the amplification of current control amplifier 370, that is:

$$I_T = \text{Aop}\ (I_Z + I_S \text{ or } I_C).$$

The inverting input of amplifier 370 is a reference voltage determined at the junction of a voltage divider comprised of a resistor 335 and a resistor 336 which is in parallel with a zener diode 333. A capacitor 373 is connected between the output of amplifier 370 and its inverting input thereby providing feedback. The output of amplifier 370 is connected through a resistor 371 to the base of the first stage current control transistor 372, which in turn is connected through its collector to the base of the second stage current control transistor 373. The output of amplifier 370 thus controls the current through the emitter of transistor 373 responsive to the signals present at the input of amplifier 370. A resistor 378 across the emitter and collector of transistor 373 serves as a current bypass and is active on circuit initialization. Circuit reference voltage is established by connecting the non-inverting input of an amplifier 401 to a voltage divider of the resistors 402, 411, and 412 across a zener 333 and a resistor 413. A capacitor 403 is connected to a line 318 and to the inverting input of amplifier 401. The inverting input of an amplifier 410 is connected between resistors 411 and 412 and non-inverting input between diode 333 and a resistor 413 thus amplifier 410 is a buffer. The output of amplifier 410 is then connected to the emitter of transistor 473. The emitter of transistor 430 is connected to line 362. Diodes 431, 432, and 433 are connected to line 318 and through resistor 434 and a capacitor 435 to the base of transistor 372, thus establishing the base to emitter bias of that transistor. Diodes 431, 432, and 433 (through resistor 434) are also connected between a collector of transistor 430 and the emitter of transistor 372, thus establishing a voltage level acceptable for amplifier 370. Transistor 430 provides a path for excess current.

It is understood then that the two wire DC transmitter is provided with a selectable known time varying light signal from the calibrator. Reception of the light signal by the light sensor at the transmitter does not require physical connection to the calibrator or the transmitter. The total DC current $I_T$ from the transmitter is adjusted by the adjusting SPAN device 16 and ZERO device 17 to provide $I_T$ representative of the calibration current $I_C$ hence calibrating the transmitter without the need of additional connection thereto.

CONCLUSION

From the foregoing, an apparatus to generate and transmit a light signal of known frequency to a receiving circuit such as a two wire transmitter is described.

The ease of coupling the transmitted light or infrared signal and receiving same without the requirement of an electrical conductor between the transmitting and receiving circuitry has many significant advantages. First, there is no need for a mechanical interconnection of conductors to couple the circuitry. Second, electrical noise along the light path means does not interfere with the transmitted or received light signal as electrical isolation between calibrator and transmitter is provided. Third, the ease of coupling the known frequency time varying light signal to the transmitter is accomplished by merely placing the calibrator and transmitter in appropriate physical relationship. Fourth, the lack of requirement of mechanical couplings further obviates the possibility of human error in making such connection. Such human error is often responsible for other failures within the transmitting or receiving device. Other advantages have been explained herein and are apparent from the nature of the invention.

Although the present invention has been described with reference to preferred embodiments, those skilled in the art will recognize that changes may be made in form and detail without departing from the spirit and scope of the present invention.

What I claim is:

1. Apparatus for calibrating a two wire DC transmitter of the type having a sensor which provides a time varying sensor signal representative of a parameter to be sensed, current control means for controlling, as a function of time varying signals received, total DC current in two wires which couple the transmitter to an external DC power supply and an external series connected load, the apparatus comprising:

a calibrator having:

an oscillator means for generating a known time varying oscillator signal;

light emitting means coupled to the oscillator means for providing a time varying light signal in response to the time varying oscillator signal; and opening means providing for passage of light from the calibrator; and the two wire transmitter having:

light sensor means for receiving the time varying light signal from the calibrator and for providing a time varying calibration signal as a function of the time varying light signal;

selection means for selectively providing the time varying calibration signal or the time varying sensor signal to the current control means; and adjustment means for adjusting the total DC current from the transmitter when the time varying calibration signal is selected to provide a known relationship to the known time varying oscillator signal, thereby calibrating the transmitter.

2. Apparatus according to claim 1 wherein the light emitting means comprises an infrared emitter diode.

3. Apparatus according to claim 1 wherein the light sensor means is a phototransistor.

4. Apparatus according to claim 1 wherein the calibrator further comprises counter means coupled between the oscillator and the light emitting means for providing a selectable time varying signal, arithmetically related to the time varying oscillator signal, to the light emitting means.

5. Apparatus according to claim 1 wherein the selection means further provides the time varying calibration signal to the current control means when the calibration signal is provided from the light sensor means, and provides the sensor signal to the current control means when the calibration signal is not provided from the light sensor means.

6. Apparatus according to claim 1 wherein the apparatus further comprises a light path means to provide light coupling between the calibrator light emitting means and the transmitter light sensor means.

7. Apparatus according to claim 6 wherein the light path means is a fiber optics material.

8. The apparatus of claim 1 wherein the current control means comprises:
frequency-to-voltage convertor means for receiving the selected time varying signal and providing an output voltage which is a function of the frequency of the time varying signal received; and
current control circuit means for controlling the total DC current as a function of the output voltage from the frequency-to-voltage convertor means.

9. The apparatus of claim 8 wherein the current control means further comprises:
regenerative comparator means for receiving the selected time varying signal from the selection means and supplying a square wave time varying signal to the frequency-to-voltage convertor means.

10. In combination:
a portable calibrator for use in conjunction with calibration of two wire DC transmitters comprising:
a calibrator housing;
oscillator means within the calibrator housing for generating a known time varying oscillator signal;
light emitting means coupled to the oscillator means for providing a time varying light signal in response to the time varying oscillator signal; and
opening means in the calibrator housing for permitting passage of the time varying light signal from the calibrator;
a two wire transmitter having two output terminals for connection to two wires which couple the transmitter to an external DC power supply and external series connected load, the transmitter comprising:
a transmitter housing;
parameter sensing means for providing a time varying sensor signal representative of a parameter to be sensed;
light sensor means for receiving the time varying light signal from the calibrator and for providing a time varying calibration signal as a function of the time varying light signal;
selection means within the transmitter housing for selectively providing the time varying calibration signal or the time varying sensor signal;
current control means connected to the output terminals of the transmitter for controlling, as a function of the time varying signal provided by the selection means, total DC current in the two wires which couple the transmitter to an external DC power supply and an external series connected load; and
adjustment means for adjusting the total DC current when the time varying calibration signal is selected to provide calibration of the transmitter.

11. The invention of claim 10 wherein the current control means is located within the transmitter housing.

12. The invention of claim 11 wherein the light sensor means is located within the transmitter housing, and wherein the transmitter housing further includes means for providing passage of the time varying light signal into the transmitter housing and to the light sensor means.

13. The invention of claim 12 wherein the adjustment means includes adjusting devices accessible from outside the transmitter housing without opening the transmitter housing.

14. The invention of claim 13 and further comprising:
light path means for coupling the time varying light signal from the opening means in the calibrator housing to the means for providing passage of the time varying light signal into the transmitter housing.

15. The invention of claim 14 wherein the light path means comprises a fiber optic transmission line.

16. The invention of claim 10 wherein the current control means comprises:
frequency-to-voltage convertor means for converting the selected time varying signal to an output voltage which is a function of the frequency of the selected time varying signal; and
current control circuit means for receiving the output voltage from the frequency-to-voltage convertor and controlling the total DC current as a function of the output voltage from the frequency-to-voltage convertor means.

17. The invention of claim 10 wherein the selection means provides the time varying calibration signal to the current control means when the calibration signal is provided from the light sensor means and provides the time varying sensor signal to the current control means when the time varying calibration signal is not provided from the light sensor means.

18. The invention of claim 17 wherein the selection means has first and second signal input terminals, a control input terminal, and an output terminal, the parameter sensor means being connected to the first input terminal, the light sensor means being connected to the second input terminal, and a signal indicative of the presence or absence of the time varying light signal being connected to the control input terminal, wherein the selection means connects either the first or the second input terminals to the output terminal depending upon the state of the signal at the control input terminal.

19. Apparatus for calibrating a two wire transmitter of the type having a sensor which provides a time varying sensor signal representative of a parameter to be sensed, convertor means for converting time varying signals to DC signals, and current control means coupled to the convertor for controlling, as a function of the DC signals from the convertor means, the total DC current in two wires which couple the transmitter to an external DC power supply and an external series connected load, the apparatus comprising:
   a calibrator having an oscillator for generating a known time varying oscillator signal, light emitting means coupled to the oscillator for providing a time varying light signal in response to the time varying oscillator signal, and opening means for permitting passage of the light signal from the calibrator;
   light sensor means associated with the two wire transmitter for receiving a light signal from the calibrator and providing a time varying calibration signal as a function of the light signal;
   switch means associated with the transmitter for selectively coupling the time varying calibration signal to the convertor means; and
   adjustment means associated with the transmitter for adjusting the total DC current from the transmitter when the time varying calibration signal is coupled to the convertor means, to calibrate thereby the transmitter.

20. A calibrator for calibrating a device of the type having a sensor which provides a time varying sensor signal representative of a parameter to be sensed, means for controlling, as a function of time varying signals received, an output signal of the device, the calibrator comprising:
   means for generating a known time varying signal;
   light emitting means for providing a time varying light signal in response to the known time varying signal;
   opening means providing for passage of light from the calibrator; and
   wherein the device further includes:
      means for receiving the time varying light signal from the calibrator and for providing a time varying calibration signal as a function of the time varying light signal;
      selection means for selectively providing the time varying calibration signal or a signal which is a function of the time varying sensor signal to the means for controlling an output signal; and
      adjustment means for adjusting the output signal of the device when the time varying calibration signal is selected to provide a known relationship to the known time varying signal, thereby calibrating the device.

21. In combination:
   a portable calibrator for use in conjunction with calibration of transmitters comprising:
      a calibrator housing;
      means within the calibrator housing for generating a known time varying signal;
      light emitting means for providing a time varying light signal in response to the time varying oscillator signal; and
      opening means in the calibrator housing for permitting passage of the time varying light signal from the calibrator;
   a transmitter having output terminals for providing an output signal to a circuit including an external load, the transmitter comprising:
      a transmitter housing;
      parameter sensing means for providing a time varying sensor signal representative of a parameter to be sensed;
      means for receiving the time varying light signal from the calibrator and for providing a time varying calibration signal as a function of the time varying light signal;
      selection means for selectively providing the time varying calibration signal or the time varying sensor signal;
      means connected to the output terminals of the transmitter for controlling the output signal as a function of the time varying signal provided by the selection means; and
      adjustment means for adjusting the output signal when the time varying calibration signal is selected to provide calibration of the transmitter.

22. Apparatus for calibrating a transmitter of the type having a sensor which provides a time varying sensor signal representative of a parameter to be sensed, converter means for converting time varying signals to DC signals, and control means coupled to the converter for controlling, as a function of the DC signals from the converter means, an output signal of the transmitter, the apparatus comprising:
   a calibrator having means for generating a known time varying signal, light emitting means coupled to the oscillator for providing a time varying light signal in response to the known time varying signal, and opening means for permitting passage of the light signal from the calibrator;
   means associated with the transmitter for receiving a light signal from the calibrator and providing a time varying calibration signal as a function of the light signal;
   switch means associated with the transmitter for selectively coupling the time varying calibration signal to the converter means; and
   adjustment means associated with the transmitter for adjusting the output signal of the transmitter when the time varying calibration signal is coupled to the converter means, to calibrate thereby the transmitter.

* * * * *